(12) United States Patent
Park et al.

(10) Patent No.: US 11,869,723 B2
(45) Date of Patent: Jan. 9, 2024

(54) MULTILAYERED CAPACITOR AND BOARD HAVING THE SAME MOUNTED THEREON

(71) Applicant: SAMSUNG ELECTRO-MECHANICS CO., LTD., Suwon-si (KR)

(72) Inventors: Yong Park, Suwon-si (KR); Sim Chung Kang, Suwon-si (KR); Jong Ho Lee, Suwon-si (KR); Hyung Soon Kwon, Suwon-si (KR); Woo Chul Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/868,281

(22) Filed: Jul. 19, 2022

(65) Prior Publication Data
US 2022/0351910 A1 Nov. 3, 2022

Related U.S. Application Data

(63) Continuation of application No. 16/855,274, filed on Apr. 22, 2020, now Pat. No. 11,495,410.

(30) Foreign Application Priority Data

Jul. 15, 2019 (KR) .................. 10-2019-0084958

(51) Int. Cl.
*H01G 4/30* (2006.01)
*H01G 4/012* (2006.01)
(Continued)

(52) U.S. Cl.
CPC ............... *H01G 4/30* (2013.01); *H01G 4/012* (2013.01); *H01G 4/1227* (2013.01); *H01G 4/2325* (2013.01); *H01G 4/248* (2013.01)

(58) Field of Classification Search
CPC ........ H01G 4/012; H01G 4/1227; H01G 4/33; H01G 4/248; H01G 4/0085; H01G 4/224; H01G 4/2325; H01G 4/30
See application file for complete search history.

(56) References Cited

U.S. PATENT DOCUMENTS

| 2001/0055193 A1 | 12/2001 | Chazono et al. | |
| 2006/0138590 A1* | 6/2006 | Suzuki .................... | H01G 4/30 |
| | | | 257/532 |

(Continued)

FOREIGN PATENT DOCUMENTS

| CN | 101456727 A | 6/2009 |
| CN | 105280377 A | 1/2016 |

(Continued)

OTHER PUBLICATIONS

Office Action issued in corresponding Japanese Patent Application No. 2020-078724 dated May 25, 2021, with English translation.

(Continued)

*Primary Examiner* — Michael P McFadden
(74) *Attorney, Agent, or Firm* — Morgan, Lewis & Bockius LLP

(57) ABSTRACT

A multilayer capacitor includes: a capacitor body including first and second internal electrodes alternately stacked with a dielectric layer interposed therebetween, and having first to six surfaces, the first internal electrode being exposed through the third, fifth, and sixth surfaces, the second internal electrode being exposed through the fourth, fifth, and sixth surfaces; first and second side portions disposed on the fifth and sixth surfaces of the capacitor body; and first and second external electrodes. The capacitor body includes upper and lower cover portions disposed on an upper surface of an uppermost internal electrode and a lower surfaces of a lowermost internal electrode, respectively, in a stacking direction of the first and second internal electrodes. The first (Continued)

and second side portions and the upper and lower cover portions include zirconium (Zr).

10 Claims, 7 Drawing Sheets

(51) Int. Cl.
*H01G 4/248* (2006.01)
*H01G 4/12* (2006.01)
*H01G 4/232* (2006.01)

(56) References Cited

U.S. PATENT DOCUMENTS

| | | | |
|---|---|---|---|
| 2009/0149312 A1 | 6/2009 | Aman et al. | |
| 2015/0036264 A1* | 2/2015 | Morita | C04B 35/4682 361/321.4 |
| 2015/0279565 A1* | 10/2015 | Teraoka | H01G 4/1227 361/301.4 |
| 2015/0364259 A1 | 12/2015 | Kanzaki et al. | |
| 2016/0196918 A1* | 7/2016 | Hong | H01G 4/232 361/301.4 |
| 2016/0284471 A1* | 9/2016 | Mizuno | H01G 4/1227 |
| 2017/0018358 A1 | 1/2017 | Isota et al. | |
| 2017/0040111 A1* | 2/2017 | Kim | H01G 4/1227 |
| 2017/0169952 A1* | 6/2017 | Kato | H01G 4/2325 |
| 2017/0271082 A1 | 9/2017 | Yoon et al. | |
| 2018/0061575 A1 | 3/2018 | Mizuno | |
| 2018/0294097 A1 | 10/2018 | Ono et al. | |
| 2019/0180936 A1 | 6/2019 | Cha et al. | |
| 2019/0189346 A1 | 6/2019 | Koga et al. | |
| 2019/0198248 A1 | 6/2019 | Son et al. | |
| 2019/0237254 A1* | 8/2019 | Sakurai | C04B 35/638 |

FOREIGN PATENT DOCUMENTS

| | | |
|---|---|---|
| CN | 106356191 A | 1/2017 |
| CN | 107799306 A | 3/2018 |
| CN | 108695070 A | 10/2018 |
| JP | 2017-147358 A | 8/2017 |
| JP | 2019-102798 A | 6/2019 |
| JP | 2019-114766 A | 7/2019 |
| KR | 10-2001-0082166 A | 8/2001 |

OTHER PUBLICATIONS

Office Action issued in corresponding Chinese Patent Application No. 202010661191.1 dated Aug. 27, 2021, with English translation.
Final Office Action issued in corresponding U.S. Appl. No. 16/855,274 dated Jun. 16, 2022.
Office Action issued in corresponding U.S. Appl. No. 16/855,274 dated Feb. 22, 2022.
Final Office Action issued in corresponding U.S. Appl. No. 16/855,274 dated Dec. 14, 2021.
Office Action issued in corresponding U.S. Appl. No. 16/855,274 dated Jul. 19, 2021.

* cited by examiner

US 11,869,723 B2

MULTILAYERED CAPACITOR AND BOARD HAVING THE SAME MOUNTED THEREON

CROSS-REFERENCE TO RELATED APPLICATION(S)

The present application is a continuation application of U.S. patent application Ser. No. 16/855,274 filed on Apr. 22, 2020, which claims the benefit of priority to Korean Patent Application No. 10-2019-0084958, filed on Jul. 15, 2019 in the Korean Intellectual Property Office, the entire disclosures of which are incorporated herein by reference in their entirety.

TECHNICAL FIELD

The present disclosure relates to a multilayer capacitor and a mounting substrate thereof.

BACKGROUND

Electronic components using ceramic materials include capacitors, inductors, piezoelectric elements, varistors, or thermistors.

Among them, multilayer capacitors could be used in various electronic devices due to their small size and high capacity.

Recently, the application range of multilayer capacitors has been expanded from IT products to electronic products. In particular, multilayer capacitors used in electronic products require high reliability due to harsh driving environments.

Such a multilayer capacitor includes a capacitor body formed of a ceramic material, an internal electrode disposed inside the capacitor body, and an external electrode installed on a surface of the capacitor body to be connected to the internal electrode.

Recently, due to miniaturization and multifunctionality of electronic devices, multilayer capacitors have also been required to be provided as a product with a small size and large capacity. To this end, an internal electrode is allowed to be exposed in a width direction of a capacitor body, so a multilayer capacitor having a structure in which an area in a width direction of an internal electrode is significantly increased has been manufactured.

In a multilayer capacitor having such a structure, a capacitor body is manufactured, and then side portions are separately attached to both sides in a width direction of the capacitor body in an operation before sintering. Thus, the side portions cover exposed portions of the internal electrode.

Further, multilayer capacitors having a structure in which an internal electrode is exposed in a width direction of a capacitor body also require a research to secure high reliability in order to meet standards for electronic devices and electric apparatuses.

SUMMARY

An aspect of the present disclosure is to provide a multilayer capacitor in which a side portion and a cover region of a capacitor body include Zr to improve reliability, and a mounting surface thereof.

According to an aspect of the present disclosure, a multilayer capacitor includes: a capacitor body including first and second internal electrodes alternately stacked with a dielectric layer interposed therebetween, and having first and second surfaces opposing each other, third and fourth surfaces connected to the first and second surfaces and opposing each other, and fifth and sixth surfaces connected to the first and second surfaces, connected to the third and fourth surfaces, and opposing each other. The first internal electrode is exposed through the third, fifth, and sixth surfaces, and the second internal electrode is exposed through the fourth, fifth, and sixth surfaces; first and second side portions disposed on the fifth and sixth surfaces of the capacitor body, respectively. The multilayer capacitor further includes first and second external electrodes disposed on the third and fourth surfaces of the capacitor body, respectively, and connected to the first and second internal electrodes, respectively. The capacitor body includes upper and lower cover portions disposed on an upper surface of an uppermost internal electrode and a lower surfaces of a lowermost internal electrode, respectively, in a stacking direction of the first and second internal electrodes. The first and second side portions and the upper and lower cover portions include zirconium (Zr).

Each of the first and second side portions and the upper and lower cover portions may include the Zr content equal to or less than 1 mol %.

The first and second side portions may further include magnesium (Mg).

Each of the first and second side portions may include the Mg content of 10 mol % to 30 mol %, in comparison to $BaTiO_3$ (BT).

The upper and lower cover portions may further include magnesium (Mg).

Each of the upper and lower cover portions may include the Mg content of 10 mol % to 30 mol %, in comparison to BT.

An average thickness of the first and second internal electrodes may be equal to or less than 0.41 µm.

An average thickness of the dielectric layer may be equal to or less than 0.4 µm.

The multilayer capacitor may have a length of 1.0 mm, and a width of 0.5 mm.

The first and second external electrodes may respectively include: first and second connecting portions disposed on the third surface and the fourth surface of the capacitor body, respectively, and connected to the first and second internal electrodes; and first and second band portions extended to a portion of the first surface of the capacitor body from the first and second connecting portions.

According to another aspect of the present disclosure, a mounting substrate of a multilayer capacitor includes: a substrate having first and second electrode pads on one surface; and a multilayer capacitor mounted to allow first and second external electrodes to be connected to the first and second electrode pads, respectively.

Other features and aspects will be apparent from the following detailed description, the drawings, and the claims.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
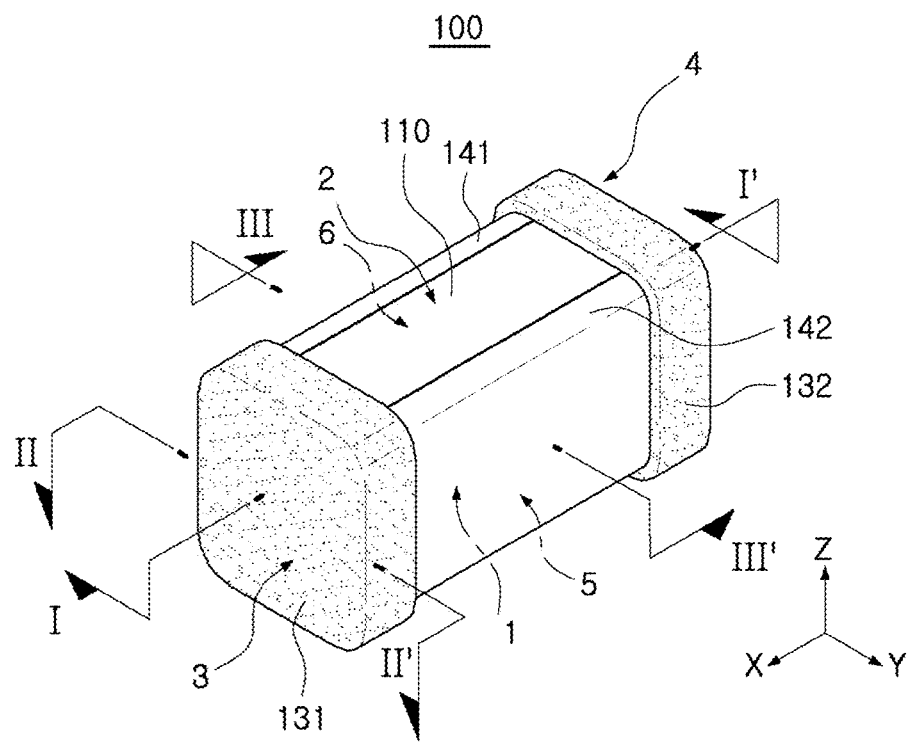
FIG. 1 is a schematic perspective view of a multilayer capacitor according to an exemplary embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

When orientations are defined to clearly describe an exemplary embodiment of the present disclosure, X, Y, and Z on the drawings indicate a length direction, a width direction, and a thickness direction of a multilayer capacitor, respectively.

Moreover, in an exemplary embodiment of the present disclosure, a Z direction may be used as having the same meaning as a stacking direction in which dielectric layers are stacked on each other.

Figure 2:
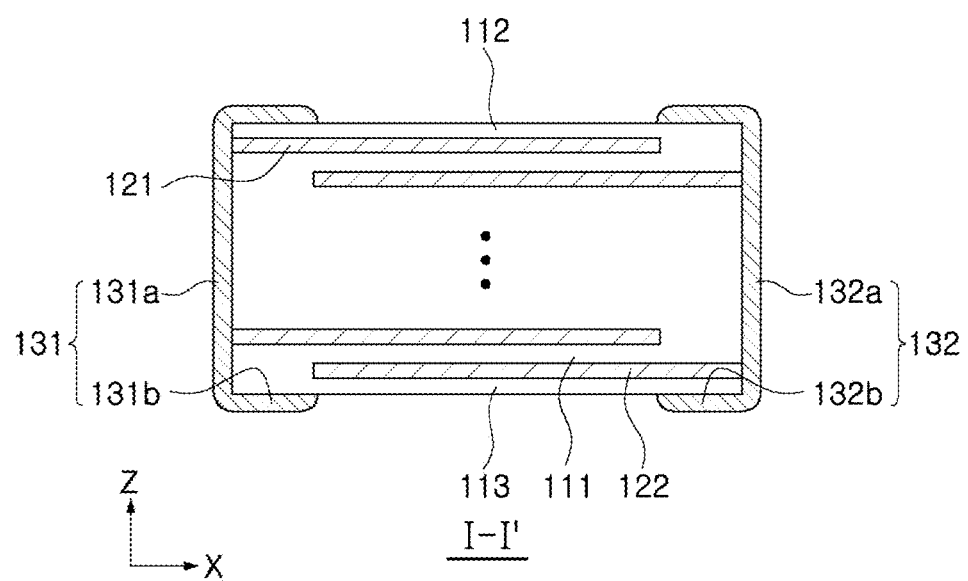
FIG. 2 is a cross-sectional view taken along line I-I' of FIG. 1.
Figure 3A:
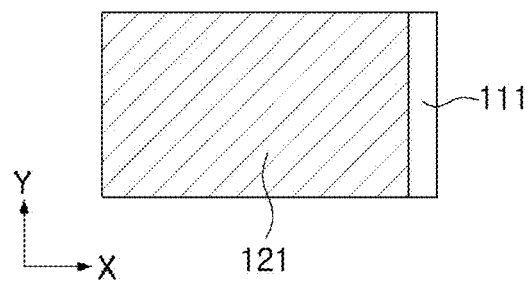
FIGS. 3A and 3B are cross-sectional views illustrating a structure of each of first and second internal electrodes, respectively, applied to the multilayer capacitor of FIG. 1.
Figure 3B:
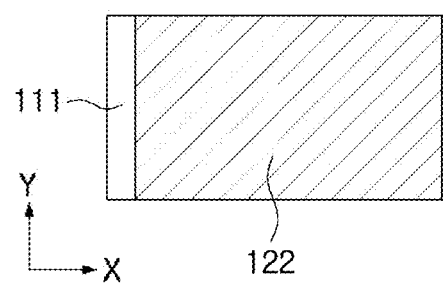
Figure 4:
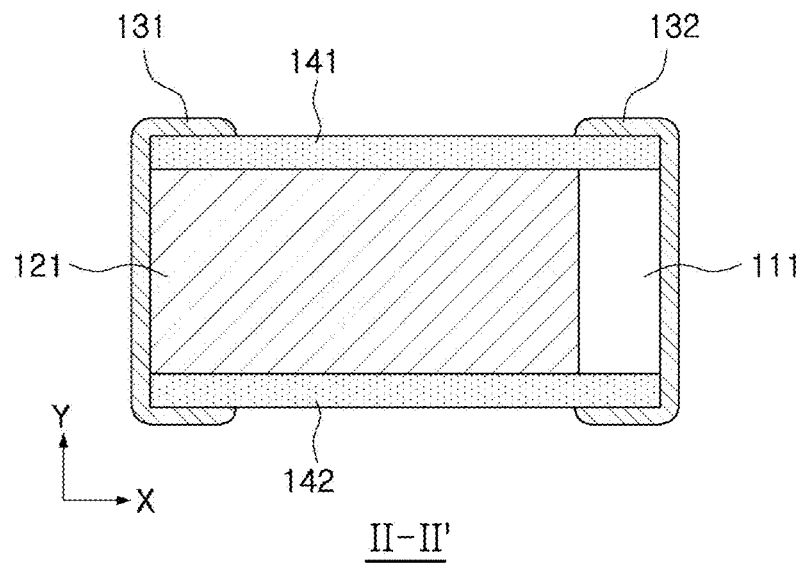
FIG. 4 is a cross-sectional view taken along line II-II' of FIG. 1.
Figure 5:
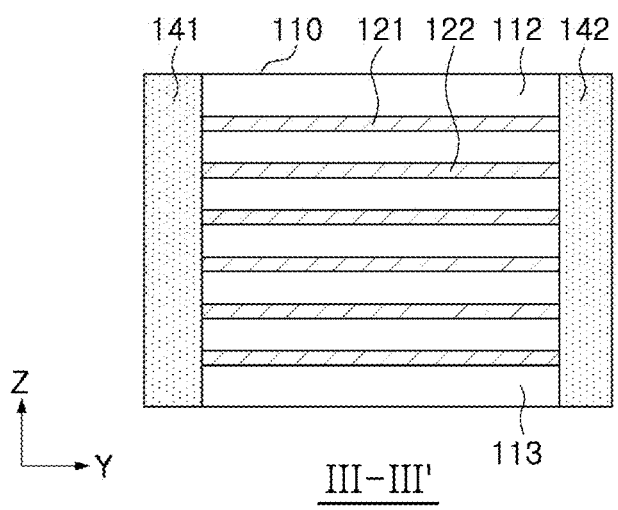
FIG. 5 is a cross-sectional view taken along line III-III' of FIG. 1.

FIG. 1 is a schematic perspective view of a multilayer capacitor according to an exemplary embodiment of the present disclosure, FIG. 2 is a cross-sectional view taken along line I-I' of FIG. 1, FIGS. 3A and 3B are cross-sectional views illustrating a structure of each of first and second internal electrodes, respectively, applied to the multilayer capacitor of FIG. 1, FIG. 4 is a cross-sectional view taken along line II-II' of FIG. 1, and FIG. 5 is a cross-sectional view taken along line of FIG. 1.

Next, a multilayer capacitor according to an exemplary embodiment of the present disclosure will be described with reference to FIGS. 1 to 5.

Referring to FIGS. 1 to 5, a multilayer capacitor 100 according to an exemplary embodiment of the present disclosure includes a capacitor body 110, first and second side portions 141 and 142, and first and second external electrodes 131 and 132.

In this case, the first and second side portions 141 and 142 include zirconium (Zr).

In addition, the capacitor body 110 includes an active area 115 and upper and lower cover portions 112 and 113.

In this case, the upper and lower cover portions 112 and 113 include Zr.

In an exemplary embodiment of the present disclosure, the active area does not include Zr, while a margin portion, upper and lower cover portions and a side portion include Zr. Thus, density of a side portion and a cover portion is increased and a breakdown voltage (BDV) is increased, and reliability is improved.

Moreover, a length of the multilayer capacitor 100 in an X direction, according to an exemplary embodiment of the present disclosure, is 1.0 mm, and a width thereof in a Y direction is 0.5 mm.

The plurality of dielectric layers 111, forming the capacitor body 110, are stacked in the Z direction and then sintered, and adjacent dielectric layers 111 of the capacitor body 110 are integrated so that boundaries therebetween are not readily apparent without using a scanning electron microscope (SEM).

In addition, the capacitor body 110 includes a plurality of dielectric layers 111 and first and second internal electrodes 121 and 122 have different polarities and alternately arranged in the Z direction with the dielectric layer 111 interposed therebetween.

Moreover, the capacitor body 110 may include an active area as a portion which contributes to the formation of the capacity of a capacitor, and upper and lower cover portions 112 and 113 as a margin portion. In the active area, the first and second internal electrodes are alternately disposed in the Z direction with the dielectric layer 111 interposed therebetween. The upper and lower cover portions are provided on upper and lower surfaces of the active area in the Z direction, respectively.

The capacitor body 110, described above, has a shape without limitation, and may have a hexahedral shape, and may include a first surface 1 and a second surface 2, opposing each other in the Z direction, a third surface 3 and a fourth surface 4, connected to the first surface 1 and the second surface 2 and opposing each other in the X direction, and a fifth surface 5 and a sixth surface 6, connected to the first surface 1 and the second surface 2, connected to the third surface 3 and the fourth surface 4 and opposing each other. In this case, the first surface 1 may be a mounting surface.

The dielectric layer 111 may include ceramic powder, for example, $BaTiO_3$-based ceramic powder, or the like.

Moreover, the $BaTiO_3$-based ceramic powder may be $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca or Zr is partially dissolved in $BaTiO_3$(BT), but an embodiment of the present disclosure is not limited thereto.

Moreover, a ceramic additive, an organic solvent, a plasticizer, a binder, a dispersant, and the like may also be added to the dielectric layers 111 along with the ceramic powder.

The ceramic additive may include, for example, a transition metal oxide or a transition metal carbide, a rare earth element, magnesium (Mg), aluminum (Al), or the like.

The first and second internal electrodes 121 and 122 are electrodes to which different polarities are applied, are formed on the dielectric layer 111 and stacked on the Z direction, and may be arranged alternately to oppose each other in the Z direction inside the capacitor body 110 with a single dielectric layer 111 interposed therebetween.

In this case, the first and second internal electrodes 121 and 122 may be electrically isolated from each other by the dielectric layers 111 interposed therebetween.

Moreover, the first internal electrode 121 is exposed through the third surface 3, the fifth surface 5, and the sixth surface 6, of the dielectric layer 111. In this case, the first internal electrode 121 may also be exposed through a corner connecting the third surface 3 to the fifth surface 5 of the capacitor body 110 and a corner connecting the third surface 3 to the sixth surface 6 of the capacitor body 110.

The second internal electrode 122 is exposed through the fourth surface 4, the fifth surface 5, and the sixth surface 6, of the dielectric layer 111. In this case, the second internal electrode 122 may also be exposed through a corner connecting the fourth surface 4 to the fifth surface 5 of the capacitor body 110 and a corner connecting the fourth surface 4 to the sixth surface 6 of the capacitor body 110.

In this case, end portions of the first and second internal electrodes 121 and 122, alternately exposed through the third surface 3 and the fourth surface 4 of the capacitor body 110, may be in contact with and electrically connected to the first and second external electrodes 131 and 132, disposed on both end portions of the capacitor body 110 in the X direction, to be described later.

According to the above configuration, when a predetermined voltage is applied to the first and second external electrodes 131 and 132, charges are accumulated between the first and second internal electrodes 121 and 122.

In this case, the capacitance of the multilayer capacitor 100 is proportional to an area of overlap between the first and second internal electrodes 121 and 122, overlapping each other in the Z direction in the active area 115.

As in an exemplary embodiment of the present disclosure, when the first and second internal electrodes 121 and 122 are configured, not only basic areas of the first and second internal electrodes 121 and 122 are expanded, but also the capacity of the multilayer capacitor 100 may be increased by increasing an area vertically overlapped.

Moreover, a stepped portion caused by an internal electrode may be reduced, so the accelerated life of insulation resistance may be improved. Thus, a multilayer capacitor with excellent capacity characteristics and improved reliability may be provided.

In this case, a material, forming the first and second internal electrodes 121 and 122, is not particularly limited. For example, the first and second internal electrodes may be formed using a precious metal material or a conductive paste formed of at least one between nickel (Ni) and copper (Cu).

In addition, a method of printing the conductive paste such as screen printing or gravure printing may be used, but an embodiment of the present disclosure is not limited thereto.

The first side portion 141 is disposed on the fifth surface 5 of the capacitor body 110, while the second side portion 142 is disposed on the sixth surface 6 of the capacitor body 110.

The first and second side portions 141 and 142 are in contact with front ends to cover the front ends of portions exposed through the fifth surface 5 and the sixth surface 6 of the capacitor body 110 in the first and second internal electrodes 121 and 122.

The first and second side portions 141 and 142 may serve to protect the capacitor body 110 and the first and second internal electrodes 121 and 122 from an external impact, and to secure insulation properties and moisture resistance reliability around the capacitor body 110.

Voltages having different polarities are provided for the first and second external electrodes 131 and 132, and the first and second external electrodes are disposed in both end portions of the capacitor body 110 in the X direction and are in contact with and electrically connected to portions exposed through the third surface 3 and the fourth surface 4 of the capacitor body 110 in the first and second internal electrodes 121 and 122.

The first external electrode 131 may include a first connection portion 131a and a first band portion 131b.

The first connecting portion 131a is disposed on the third surface 3 of the capacitor body 110, and in contact with an end portion exposed externally through the third surface 3 of the capacitor body 110 in the first internal electrode 121 to physically and electrically connect the first internal electrode 121 to the first external electrode 131.

The first band portion 131b is a portion extended from the first connecting portion 131a to a portion of the first surface 1 of the capacitor body 110.

In this case, the first band portion 131b is further extended to the second surface 2, the fifth surface 5, and the sixth surface 6 of the capacitor body 110 to improve adhesion strength if required, so as to cover one end portion of the first and second side portions 141 and 142.

The second external electrode 132 may include a second connection portion 132a and a second band portion 132b.

The second connecting portion 132a is disposed on the fourth surface 4 of the capacitor body 110, and in contact with an end portion exposed externally through the second surface 4 of the capacitor body 110 in the second internal electrode 122 to physically and electrically connect the second internal electrode 122 to the second external electrode 132.

The second band portion 132b is a portion extended from the second connecting portion 132a to a portion of the first surface 1 of the capacitor body 110.

In this case, the second band portion 132b is further extended to the second surface 2, the fifth surface 5, and the sixth surface 6 of the capacitor body 110 to improve adhesion strength if required, so as to cover the other end portion of the first and second side portions 141 and 142.

In general, in a process of forming a side portion, a large amount of voids are generated at an interface in which a capacitor body and a side portion are in contact with each other, so reliability may be degraded.

Moreover, due to a void generated at an interface in which a capacitor body and a side portion are in contact with each other, a concentration of an electric field is generated. Thus, a breakdown voltage (BDV) may be lowered.

In addition, due to the void, outer sintering density is lowered, so degradation of moisture resistance reliability may be caused.

According to an exemplary embodiment of the present disclosure, Zr is added to a side portion and a cover portion. Thus, an oxide layer may be formed in a void generated at an interface in which an active area of a capacitor body and the side portion and the cover portion are in contact with each other.

As described above, when an oxide layer is formed in a void generated an interface in which a capacitor body and a side portion are in contact with each other, insulating properties are obtained to mitigate a concentration of an electric field. Accordingly, a breakdown voltage (BDV) is increased and a short defect may be reduced.

In an exemplary embodiment of the present disclosure, the first and second side portions 141 and 142 and the upper and lower cover portions 112 and 113 may include the Zr content equal to or less than 1 mol % as compared with a total mol of the first and second side portions 141 and 142 and the upper and lower cover portions 112 and 113.

Figure 10:
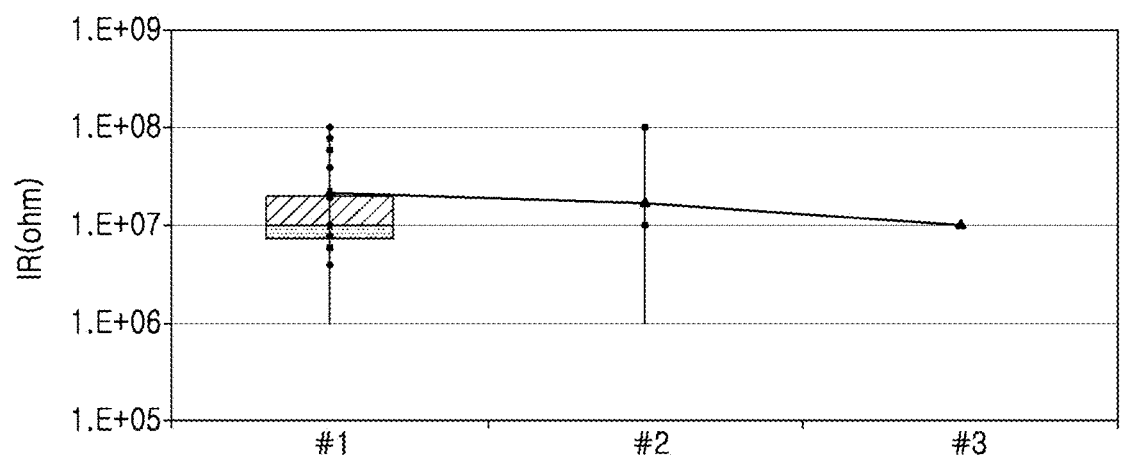
FIG. 10 is a graph illustrating Insulation Resistance (IR) according to the Zr content of a side portion and a cover portion.

FIG. 10 is a graph illustrating Insulation Resistance (IR) according to the Zr content of a side portion and a cover portion.

In FIG. 10, #1 is the case in which Zr is not included in first and second side portions, in addition to upper and lower cover portions, #2 is the case in which Zr in an amount of 0.5 mol % is included in the first and second side portions, in addition to the upper and lower cover portions, and #3 is the case in which Zr in an amount of 1.0 mol % is included in the first and second side portions, in addition to the upper and lower cover portions.

In FIG. 10, when Zr is included, it is confirmed that dispersion of moisture resistance reliability is improved. In detail, it is confirmed that, as the Zr content is increased, the dispersion of moisture resistance reliability is further improved.

Moreover, in the first and second side portions 141 and 142, in addition to the upper and lower cover portions 112 and 113, if the Zr content exceeds 1 mol % as compared with the total mol, sintering of BT is significantly reduced. Thus, it may be difficult to implement capacitance characteristics of a multilayer capacitor at the same temperature level.

In addition, during sintering, sintering of a dielectric layer and an internal electrode is mismatched, so electrical characteristics of a multilayer capacitor may be degraded, and strength and reliability may be lowered.

Moreover, the first and second side portions 141 and 142 may further include magnesium (Mg).

As described above, when the first and second side portions 141 and 142 further include magnesium, an oxide layer may be formed in a void generated at an interface in which an active area of a capacitor body and the side portion and the cover portion are in contact with each other.

In this case, the first and second side portions 141 and 142 may include the Mg content of 10 mol % to 30 mol % in comparison to BT.

When the first and second side portions 141 and 142 include Mg, an oxide layer may be formed in a void formed at an interface in which a side portion and a capacitor body are in contact with each other.

When the Mg content is increased in the first and second side portions 141 and 142, a length of an oxide layer is increased. Thus, the oxide layer blocks a void to form an insulating layer.

Moreover, the insulating layer prevents a concentration of an electric field to improve BDV of a multilayer capacitor, and reliability of the multilayer capacitor may be improved due to a reduction in the void.

In each of the first and second side portions 141 and 142, when the Mg content is equal to or more than 10 mol % in comparison to BT, the effect described above may be properly obtained.

Moreover, in each of the first and second side portions 141 and 142, if the Mg content exceeds 30 mol % in comparison to BT, sintering is degraded. Thus, a pore in the first and second side portions 141 and 142 is significantly increased, and dispersion of BDV is poor, so reliability of a multilayer capacitor may be degraded.

In addition, the upper and lower cover portions 112, 113 may further include magnesium (Mg).

In this case, each of the upper and lower cover portions 112 and 113 may include the Mg content of 10 mol % to 30 mol %, in comparison to BT.

When Mg is included in the upper and lower cover portions 112 and 113, an oxide layer may be formed in a void formed at an interface in which the upper and lower cover portions 112 and 113 and the active area of the capacitor body are in contact with each other.

When the Mg content is increased in the upper and lower cover portions 112 and 113, a length of an oxide layer is increased, so the oxide layer blocks a void to form an insulating layer.

Moreover, the insulating layer prevents a concentration of an electric field to improve BDV of a multilayer capacitor, and reliability of the multilayer capacitor may be improved due to a reduction in the void.

In each of the upper and lower cover portions 112 and 113, only when the Mg content is equal to or more than 10 mol % in comparison to BT, may the effect described above be properly obtained.

Moreover, in each of the upper and lower cover portions 112 and 113, if the Mg content exceeds 30 mol % in comparison to BT, sintering is degraded. Thus, a pore in the upper and lower cover portions 112 and 113 is significantly increased, and dispersion of BDV is poor, so reliability of a multilayer capacitor may be degraded.

Figure 6:
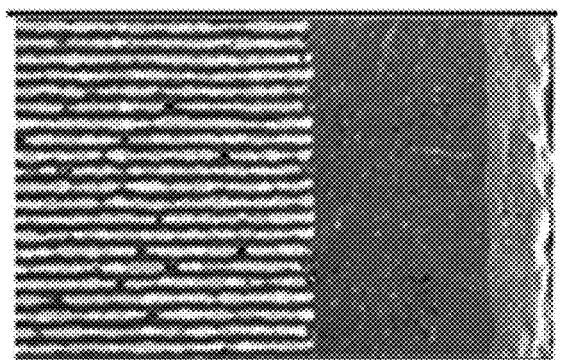
FIGS. 6, 7, and 8 are SEM images in which grains of side portions according to Comparative Example, Example 1, and Example 2 are enlarged.
Figure 7:
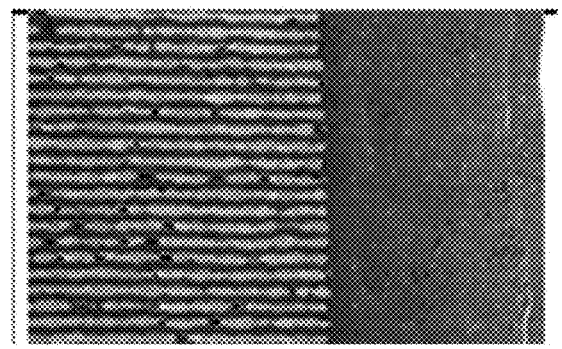
Figure 8:
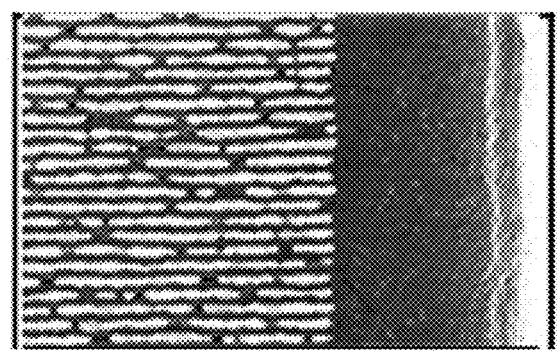

FIGS. 6, 7, and 8 are SEM images in which grains of side portions according to Comparative Example, Example 1, and Example 2, are enlarged Here, Comparative Example is the case in which a side portion does not include Zr, Example 1 is the case in which a side portion includes Zr of 0.5 mol % as comparison with the total mol, and Example 2 is the case in which a side portion includes Zr 1.0 mol % in comparison with the total mol.

Referring to FIGS. 6 to 8, in the case of Examples 1 and 2 in which Zr is included, compared to Comparative Example, it is confirmed that, while growth of grain size is suppressed, sintering density is increased.

In detail, in the case of Example 2 in which the Zr content of 1.0 mol % is included in comparison with the total mol of a side portion, compared to Example 1, it is confirmed that, while growth of grain size is further suppressed, sintering density is further increased.

Thus, in the case of Example 1 and Example 2 of the present disclosure, compared to Comparative Example, reliability may be further improved. In Example 2, compared to Example 1, reliability may be further improved.

In addition, although not illustrated, even in upper and lower cover portions, according to whether Zr is included and the Zr content, a tendency similar to a side portion may be provided.

Furthermore, in an exemplary embodiment of the present disclosure, an average thickness of a dielectric layer 111 may be equal to or less than 0.4 μm.

In addition, an average thickness of the first and second internal electrodes 121 and 122 may be equal to or less than 0.41 μm.

The multilayer capacitor according to an exemplary embodiment of the present disclosure has a structure in which first and second internal electrodes 121 and 122 are exposed through the fifth and sixth surfaces of the capacitor body, so a step of an end portion of an internal electrode in a width direction may be improved.

In this regard, even when thicknesses of the dielectric layer and the first and second internal electrodes are reduced as described above and a multilayer is thin, a significant problem does not occur in terms of reliability. Thus, while reliability of a multilayer capacitor is secured, capacity may also be increased.

In addition, when an average thickness of an internal electrode is reduced, a shrinkage rate after sintering is reduced. Thus, a diameter of an end of a capacitor body becomes smaller, and it is advantageous to improve reliability of a multilayer capacitor.

Thus, when an average thickness of a dielectric layer is equal to or less than 0.4 μm, and an average thickness of the first and second internal electrodes 121 and 122 is equal to or less than 0.41 μm, a diameter of a void is reduced. Thus, an oxide layer may be easily formed at an interface of a capacitor body and a side portion and an interface of an active area and a cover portion.

Figure 9:
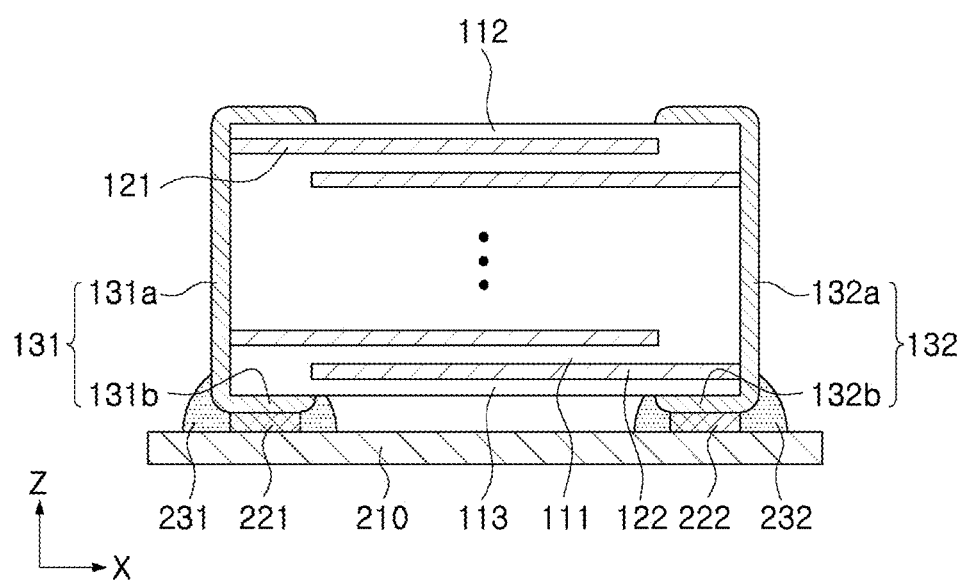
FIG. 9 is a schematic cross-sectional view illustrating the multilayer capacitor of FIG. 2 mounted on a substrate.

Referring to FIG. 9, a mounting substrate of a multilayer capacitor according to an exemplary embodiment of the present disclosure includes a substrate 210 having first and second electrode pads 221 and 222 on one surface, in addition to a multilayer capacitor 100 mounted to connect first and second external electrodes 131 and 141 to the first and second electrode pads 221 and 222, respectively, on an upper surface of the substrate 210.

In an exemplary embodiment of the present disclosure, although the multilayer capacitor 100 is illustrated and described as being mounted on the substrate 210 by solders 231 and 232, a conductive paste may be used instead of solder if necessary.

As set forth above, according to an exemplary embodiment of the present disclosure, an internal electrode is exposed to both sides in a width direction of a capacitor body, and then a side portion is attached separately. Thus, an overlapping area between internal electrodes is significantly increased, so capacity of a multilayer capacitor may be increased. Moreover, as a side portion and a cover portion include Zr, density of the side portion and the cover portion is improved, so reliability of a multilayer capacitor may be increased.

While exemplary embodiments have been shown and described above, it will be apparent to those skilled in the art that modifications and variations could be made without departing from the scope of the present invention as defined by the appended claims.

What is claimed is:

1. A multilayer capacitor, comprising:
an active area, which contributes to formation of capacity of the multilayer capacitor, including first and second internal electrodes alternately stacked with a dielectric layer interposed therebetween, the active area having third and fourth surfaces opposing each other, and fifth and sixth surfaces connected to the third and fourth surfaces and opposing each other, the first internal electrode being in contact with the third, fifth, and sixth surfaces, the second internal electrode being in contact with the fourth, fifth, and sixth surfaces;
first and second side portions disposed on the fifth and sixth surfaces of the active area, respectively, to contact the first and second internal electrodes; and
first and second external electrodes disposed on the third and fourth surfaces of the active area, respectively, and connected to the first and second internal electrodes, respectively,
wherein one of the first and second side portions includes zirconium (Zr) and magnesium (Mg), and an Mg content of the one of the first and second side portions is 10 moles or more with respect to 100 moles of $BaTiO_3$ (BT),
a Zr content of the one of the first and second side portions is equal to or less than 1 mole with respect to 100 moles of $BaTiO_3$ (BT), and
the first side portion and the second side portion include a material different from the dielectric layer of the active area such that an interface is provided between the active area and the first side portion and the second side portion.

2. The multilayer capacitor of claim 1, wherein an average thickness of the first and second internal electrodes is equal to or less than 0.41 μm.

3. The multilayer capacitor of claim 1, wherein an average thickness of the dielectric layer is equal to or less than 0.4 μm.

4. The multilayer capacitor of claim 1, further comprising upper and lower cover portions disposed on an upper surface of an uppermost internal electrode and a lower surfaces of a lowermost internal electrode, respectively, in a stacking direction of the first and second internal electrodes, wherein the upper and lower cover portions include zirconium (Zr).

5. The multilayer capacitor of claim 4, wherein the upper and lower cover portions further include magnesium (Mg).

6. The multilayer capacitor of claim 5, wherein the one of the upper and lower cover portions includes the Mg content of 10 mol to 30 mol with respect to 100 moles of $BaTiO_3$ (BT).

7. The multilayer capacitor of claim 4, wherein one of the upper and lower cover portions includes the Zr content equal to or less than 1 mol %.

8. A mounting substrate of a multilayer capacitor, comprising:
   a substrate having first and second electrode pads on one surface of the substrate; and
   the multilayer capacitor according to claim 1 mounted to allow first and second external electrodes to be connected to the first and second electrode pads, respectively.

9. The multilayer capacitor of claim 1, wherein the multilayer capacitor has a length of 1.0 mm, and a width of 0.5 mm.

10. The multilayer capacitor of claim 1, wherein the first and second external electrodes respectively includes:
    first and second connecting portions disposed on the third surface and the fourth surface of the capacitor body, respectively, and connected to the first and second internal electrodes, respectively; and
    first and second band portions extending from the first and second connecting portions, respectively, to a portion of the first surface of the capacitor body.

* * * * *